Figure 1B:
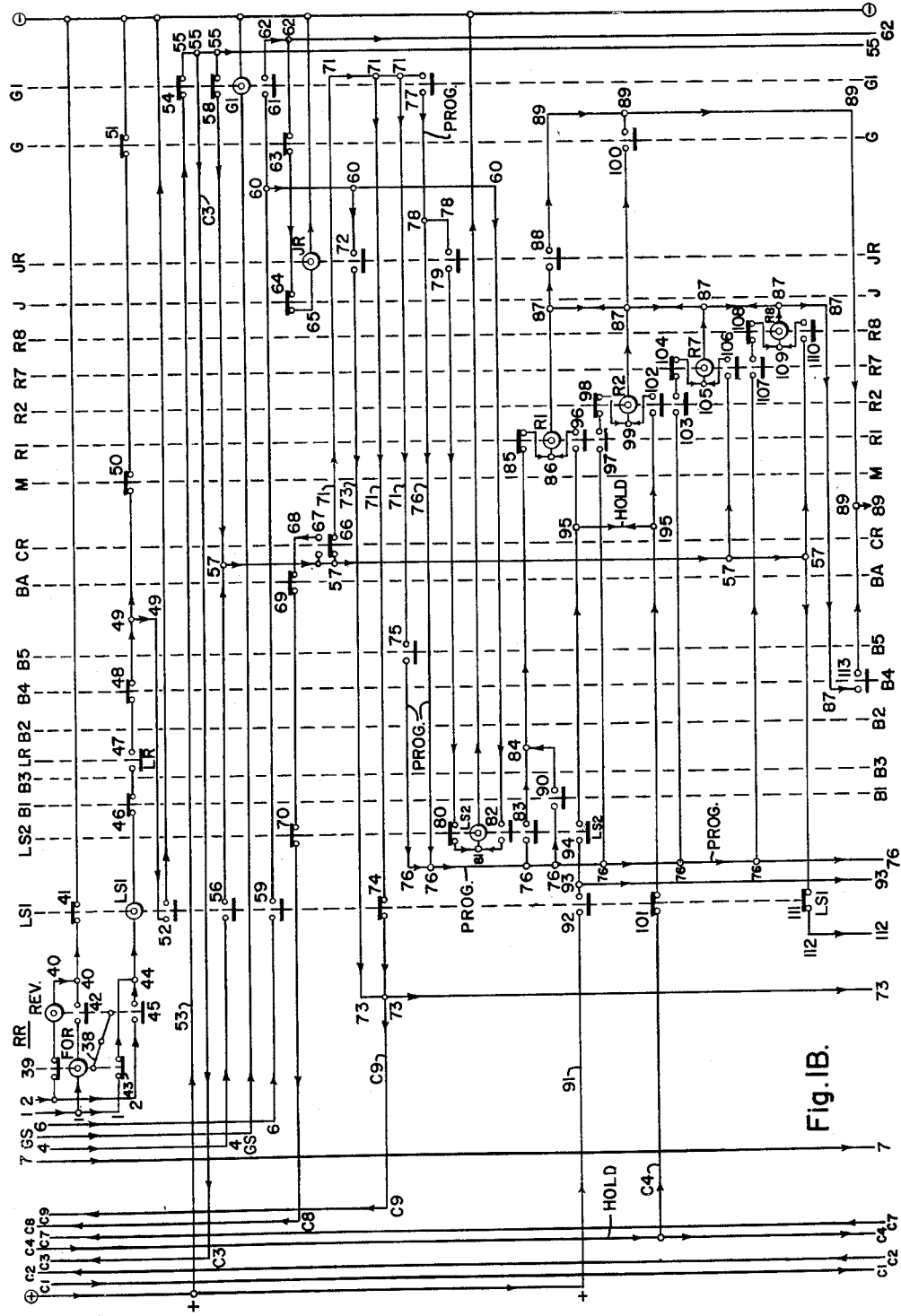

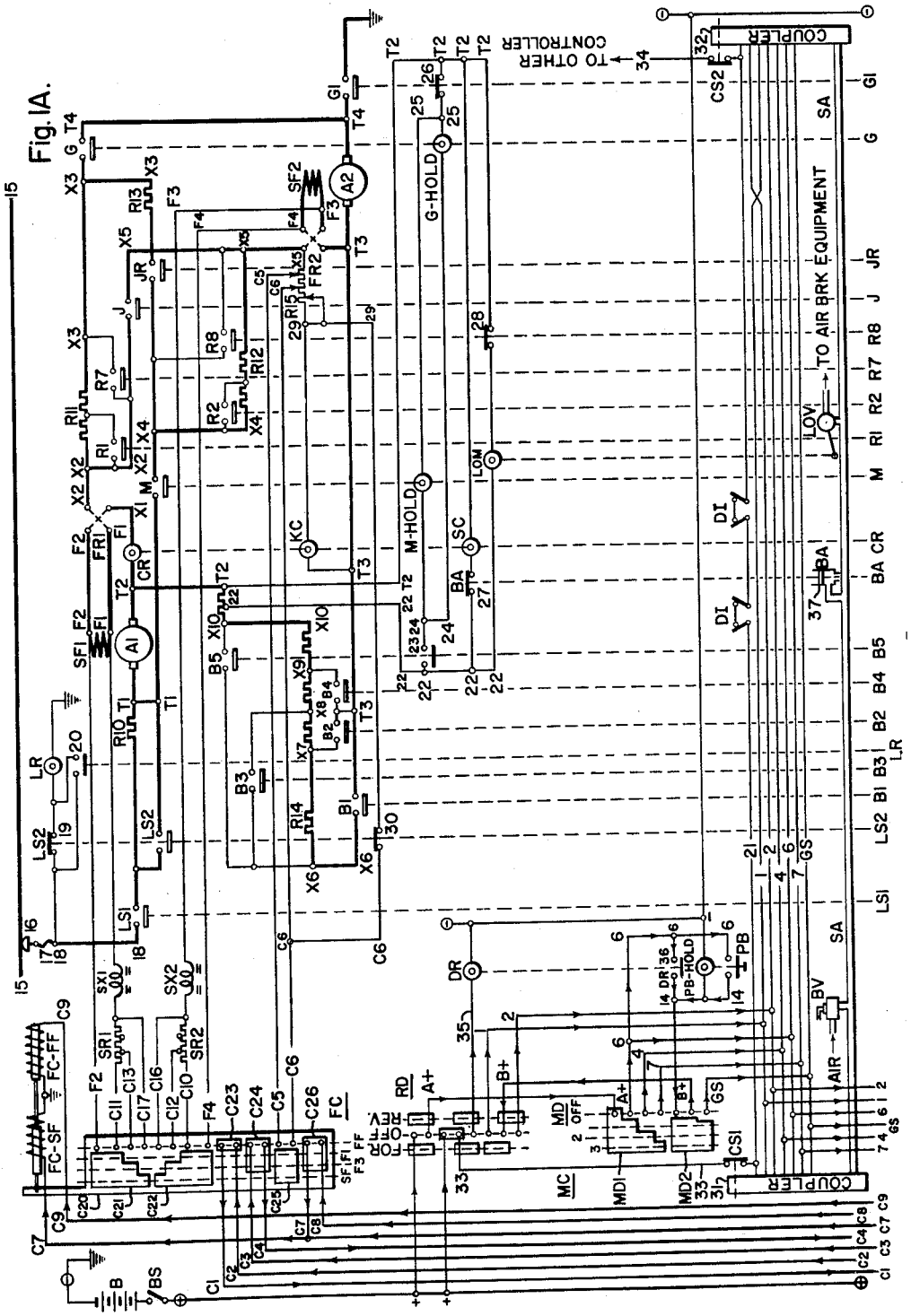
April 18, 1961     G. R. PURIFOY     2,980,036
TRACTION-MOTOR ACCELERATION AND DYNAMIC-BRAKING CONTROL
Filed July 2, 1957     4 Sheets-Sheet 1
Fig. IA.

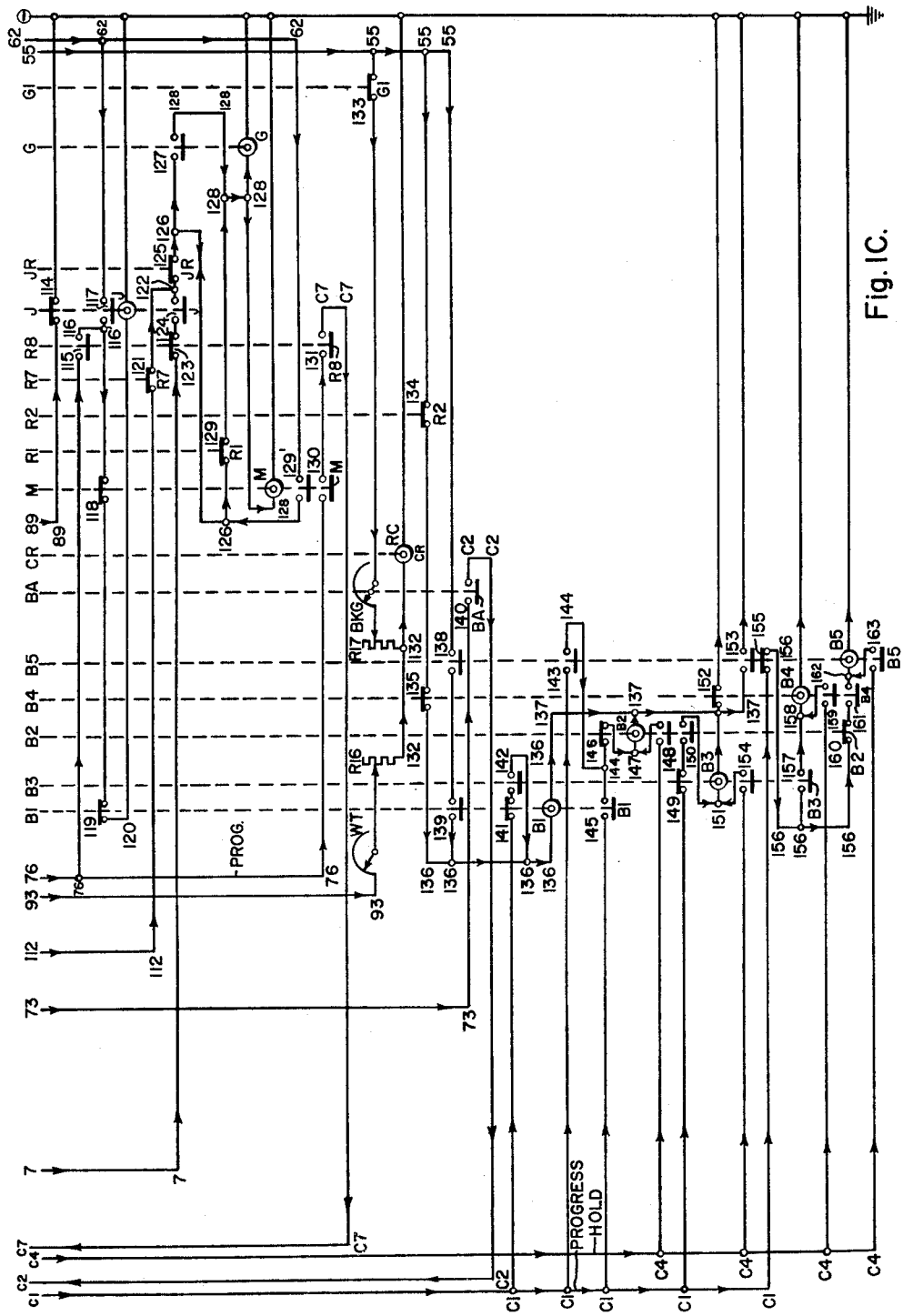
Fig. IC.

April 18, 1961 — G. R. PURIFOY — 2,980,036

TRACTION-MOTOR ACCELERATION AND DYNAMIC-BRAKING CONTROL

Filed July 2, 1957 — 4 Sheets—Sheet 4

SEQUENCE CHART

| BV | MC | STEP | LS1 | G1 | LS2 | JR | J | MG | M,G HOLD | R1 | R2 | R7 | R8 | C10 C11 | C12 C13 | C16 C17 | B1 | B2 | B3 | B4 | B5 | BA | SC | DR | LR | 1 OR 2 | 6 | GS | 4 | 7 |
|---|---|---|---|---|---|---|---|---|---|---|---|---|---|---|---|---|---|---|---|---|---|---|---|---|---|---|---|---|---|---|
| ON | OFF | A | | | | | | | | | | | | | | | | | | | | | | | | | | | | | |
| | | B | | | | | | | | | | | | | | | | | | | | | | | | ○ | | | | | |
| | | C | | | | | | | | | | | | | | | | | | | | | | | | ○ | ○ | | | | |
| OFF | | 1 P1 | ○ | ○ | | ○ | | | | | | | | | | | | | | | | | | | | ○ | ○ | ○ | ○ | ○ | | |
| | SERIES | 2 P2 | ○ | ○ | ○ | ○ | | | | | | | | | | | | | | | | | | | | ○ | ○ | ○ | ○ | ○ | ○ | |
| | | P3 | ○ | ○ | ○ | ○ | | | | ○ | | | | | | | | | | | | | | | | ○ | ○ | ○ | ○ | ○ | ○ | |
| | | P4 | ○ | ○ | ○ | ○ | | | | ○ | ○ | | | | | | | | | | | | | | ○ | ○ | ○ | ○ | ○ | ○ | |
| | | P5 | ○ | ○ | ○ | ○ | | | | ○ | ○ | ○ | | | | | | | | | | | | | ○ | ○ | ○ | ○ | ○ | ○ | |
| | | P6 | ○ | ○ | ○ | ○ | | | | ○ | ○ | ○ | ○ | | | | | | | | | | | | ○ | ○ | ○ | ○ | ○ | ○ | |
| | | P7 | ○ | ○ | ○ | | ○ | | | | | | | | | | | | | | | | | | ○ | ○ | ○ | ○ | ○ | ○ | |
| POWER | | 3 TR | ○ | ○ | ○ | | ○ | ○ | | | | | | | | | | | | | | | | | ○ | ○ | ○ | ○ | ○ | ○ | ○ |
| | PARALLEL | P8 | ○ | ○ | ○ | | ○ | | | | | | | | | | | | | | | | | | ○ | ○ | ○ | ○ | ○ | ○ | ○ |
| | | P9 | ○ | ○ | ○ | | ○ | | | ○ | | | | | | | | | | | | | | | ○ | ○ | ○ | ○ | ○ | ○ | ○ |
| | | P10 | ○ | ○ | ○ | | ○ | | | ○ | ○ | | | | | | | | | | | | | | ○ | ○ | ○ | ○ | ○ | ○ | ○ |
| | | P11 | ○ | ○ | ○ | | ○ | | | ○ | ○ | ○ | | | | | | | | | | | | | ○ | ○ | ○ | ○ | ○ | ○ | ○ |
| | | P12 | ○ | ○ | ○ | | ○ | | | ○ | ○ | ○ | ○ | | | | | | | | | | | | ○ | ○ | ○ | ○ | ○ | ○ | ○ |
| | | P13 | ○ | ○ | ○ | | ○ | | | ○ | ○ | ○ | ○ | ○ | | | | | | | | | | | ○ | ○ | ○ | ○ | ○ | ○ | ○ |
| | | P14 | ○ | ○ | ○ | | ○ | | | ○ | ○ | ○ | ○ | ○ | ○ | | | | | | | | | | ○ | ○ | ○ | ○ | ○ | ○ | ○ |
| | | P15 | ○ | ○ | ○ | | ○ | | | ○ | ○ | ○ | ○ | ○ | ○ | ○ | | | | | | | | | ○ | ○ | ○ | ○ | ○ | ○ | ○ |
| | | 2 PA | ○ | ○ | ○ | | ○ | | | ○ | ○ | ○ | ○ | ○ | ○ | ○ | | | | | | | | | ○ | ○ | ○ | ○ | ○ | ○ | |
| | | 1 PB | ○ | ○ | ○ | | ○ | | | ○ | ○ | ○ | ○ | ○ | ○ | ○ | | | | | | | | | ○ | ○ | ○ | ○ | ○ | | |
| | | OFF C' | ○ | | ○ | | ○ | | | ○ | ○ | ○ | ○ | ○ | ○ | ○ | | | | | | | | | ○ | ○ | ○ | ○ | | | |
| | | D' | ○ | | ○ | | | | | ○ | ○ | ○ | ○ | ○ | ○ | ○ | | | | | | | | | ○ | ○ | ○ | ○ | | | |
| | | E' | ○ | | ○ | | | | | | | | | ○ | ○ | ○ | | | | | | | | | ○ | ○ | ○ | ○ | | | |
| | | F' | | | | | | | | | | | | ○ | ○ | ○ | ○ | | | | | | | | ○ | ○ | | | | | |
| | SPOT | 1 | | | | | ○ | | | | | | | ○ | ○ | ○ | ○ | | | | | | ○ | ○ | ○ | | | | | | |
| | | 2 | | | | | ○ | | | | | | | ○ | ○ | | ○ | | | | | | ○ | ○ | ○ | | | | | | |
| | | 3 | | | | | ○ | | | | | | | ○ | | | ○ | | | | | | ○ | ○ | ○ | | | | | | |
| ON | | 4 | | | | | ○ | | | | | | | | | | ○ | | | | | ○ | | ○ | ○ | | | | | | |
| | | 5 | | | | | ○ | | | | | | | | | | ○ | ○ | | | | ○ | | ○ | ○ | | | | | | |
| | | 6 | | | | | ○ | | | | | | | | | | ○ | ○ | ○ | | | ○ | | ○ | ○ | | | | | | |
| | | 7 | | | | | ○ | | | | | | | | | | | ○ | ○ | ○ | | ○ | | ○ | ○ | | | | | | |
| | | 8 | | | | | ○ | ○ | | | | | | | | | | ○ | ○ | ○ | | ○ | | ○ | ○ | | | | | | |
| | BRAKING | 9 | | | | | ○ | ○ | | | | | | | | | ○ | | ○ | ○ | ○ | ○ | | ○ | ○ | | | | | | |
| | | 10 | | | | | ○ | ○ | | | | | | | | | ○ | ○ | ○ | ○ | ○ | ○ | | ○ | ○ | | | | | | |
| | | 11 | | | | | ○ | ○ | | | | | | | | | ○ | ○ | ○ | ○ | ○ | ○ | | ○ | ○ | | | | | | |
| | | 12 | | | | | ○ | ○ | ○ | | | | | | | | ○ | ○ | ○ | ○ | ○ | ○ | | ○ | ○ | | | | | | |
| | | 13 | | | | | ○ | ○ | ○ | ○ | | | | | | | ○ | ○ | ○ | ○ | ○ | ○ | | ○ | ○ | | | | | | |
| | | 14 | | | | | | ○ | ○ | ○ | ○ | | | | | | ○ | ○ | ○ | ○ | ○ | ○ | | ○ | ○ | | | | | | |
| | | 15 | | | | | | ○ | ○ | ○ | ○ | ○ | | | | | ○ | ○ | ○ | ○ | ○ | ○ | | ○ | ○ | | | | | | |
| | | FADE-OUT | | | | | | | ○ | ○ | ○ | ○ | | | | | ○ | ○ | ○ | ○ | ○ | ○ | | ○ | ○ | | | | | | |
| OFF | | 1 TR1 | | | | | | | ○ | ○ | ○ | ○ | | | | | ○ | ○ | ○ | ○ | ○ | | | ○ | ○ | ○ | ○ | | | | |
| | | TR2 | | ○ | | | | | ○ | ○ | ○ | ○ | | | | | ○ | ○ | ○ | ○ | ○ | | | ○ | ○ | ○ | ○ | ○ | | | |
| | | TR3 | | ○ | | | | | | | | | | | | | | | | | | | | ○ | ○ | ○ | ○ | ○ | | | |
| | | TR4 | ○ | ○ | | | | | | | | | | | | | | | | | | | | ○ | ○ | ○ | ○ | ○ | | | |
| | PWR | P1 | ○ | ○ | | ○ | | | | | | | | | | | | | | | | | | ○ | ○ | ○ | ○ | ○ | | | |
| OFF | PWR | 3 P15 | ○ | ○ | ○ | | ○ | | | ○ | ○ | ○ | ○ | ○ | ○ | ○ | | | | | | | | ○ | ○ | ○ | ○ | ○ | ○ | ○ | ○ |
| | | * | ○ | ○ | ○ | | ○ | | | ○ | ○ | ○ | ○ | ○ | ○ | ○ | | | | | | | | | ○ | | ○ | | ○ | ○ | ○ |
| | | *A | | | ○ | | ○ | | | ○ | ○ | ○ | ○ | ○ | ○ | ○ | | | | | | | | | ○ | | ○ | | ○ | ○ | ○ |
| | | *B | | | | | | | | ○ | ○ | ○ | ○ | ○ | ○ | ○ | | | | | | | | | ○ | | ○ | | ○ | ○ | ○ |
| | SPOT | *C | | | | | ○ | | | | | | | ○ | ○ | | ○ | | | | | | | | ○ | | ○ | | ○ | ○ | ○ |

*OPENING OF DOOR RELAY IN NO. 15 POWER-STEP P15.

Fig. 2.

United States Patent Office
2,980,036
Patented Apr. 18, 1961

2,980,036

TRACTION-MOTOR ACCELERATION AND DYNAMIC-BRAKING CONTROL

George R. Purifoy, Pittsburgh, Pa., assignor to Westinghouse Electric Corporation, East Pittsburgh, Pa., a corporation of Pennsylvania Filed July 2, 1957, Ser. No. 669,611

11 Claims. (Cl. 105—61)

My invention relates to a control-assembly for two direct-current series motor-means for a common load-device such as an electrically propelled vehicle, and it has particular relation to an electrical control-system for an electrically propelled railway-car, which is adapted to be operable either singly or as a unit of a multiple-unit train, such as is used in a rapid-transit system.

My invention relates to an improved control-system which eliminates four relays on each car, while retaining the smooth acceleration and the smooth build-up of dynamic brake which is required in this service.

My improved control-assembly also has the advantage of releasing or substantially disconnecting the dynamic-braking circuits, when dynamic brake fades out. The reason for this is, that it is necessary, in all practical dynamic-braking systems for multiple-unit rapid-transit trains, to lock out the dynamic-braking operation, after fade-out of a previous dynamic-braking operation, until there has been another application of power, as otherwise a repeated dynamic-braking operation will be too slow in building up its braking-force. In the event of a loss of power on a car, as a result of the blowing of a third-rail fuse, or from any other cause, it will be necessary to tow the car, usually as a unit of a multiple-unit train, and if the dynamic-braking circuits of a "service" braking operation have not been opened, this towing operation results in a burning out of the resistors in the dynamic-braking circuits, because these resistors do not have a sufficient time-rating to withstand such an operation.

A more detailed explanation of the specific features of my invention will be given in the following description, and will be defined in the appended claims, in connection with an illustration of an exemplary form of embodiment of the invention in the accompanying drawing, wherein:

Figs. 1A, 1B and 1C, taken together, constitute a much simplified wiring diagram of the circuits and apparatus which are necessary for an understanding of the novel features of the invention, in a preferred form of embodiment; and Fig. 2 is a sequence chart of the operation.

Figs. 1A, 1B and 1C represent some of the equipment which is carried by a single electrically propelled railway-car embodying my invention. Direct-current power is supplied to the car from a third rail 15 or a trolley wire, which is engaged by a third-rail shoe 16, or by a trolley pole, pantograph or other current-collecting equipment carried by the car. The third-rail shoe 16 is connected, through a third-rail fuse 17, to a conductor 18 which constitutes a supply-circuit for the car.

The traction-motors for the car are direct-current series motors, which are shown in Fig. 1A, by way of a simple example, as comprising two motor-armatures A1 and A2, each being associated with its own series field winding SF1 and SF2, respectively. Each of the two series motors may be regarded as representing a motor-means or circuit, each of which may comprise two or more motors which are, at times, switched as a single motor-means or circuit. For example, in most multiple-unit rapid-transit trains, each car or unit is driven by four motors, connected in two motor-circuits, each motor-circuit comprising two motors which are permanently connected in series with each other.

In Fig. 1A, the first series-motor means or circuit comprises, in series, an armature-terminal T1, a motor-armature or armatures A1, an armature-terminal T2, a series relay-coil CR of a limit-relay which is also designated CR, an intermediate circuit or conductor X1, a field-reverser FR1, a field-terminal F2, a series main-field winding or windings SF1 for supplying the field-excitation for said armature or armatures A1, a field-terminal F1, the field-reverser FR1 again, and an intermediate circuit or terminal X2. The corresponding parts for the second series motor means or circuit are indicated at T4, A2, T3, FR2, F4, SF2, F3, FR2 again, and X5, noting that the series relay-coil CR is not present in this second series-motor means or circuit.

A series-parallel motor-control arrangement is shown in Fig. 1A, in which a line-switch LS1 and a ground-switch G1 are used as power-switching means for establishing a power-circuit for energizing the motors, by connecting the armature-terminal T1 to the supply-circuit 18, and connecting the armature-terminal T4 to ground. For completing the series-circuit connections, a series-motor switch JR is closed, in addition to the power-switches LS1 and G1. For parallel-motor operation, two parallel-motor switches M and G are closed, in addition to the power-switches LS1 and G1. The parallel-motor switch M provides a circuit-connection between the armature-terminal T1 of one series-motor means, and the intermediate connection or terminal X5 of the other series-motor means; while the other parallel-motor switch G provides a circuit-connection between the armature-terminal T4 and the intermediate connection or terminal X2. During an intermediate transition-period, a transition-switch J is closed. These motor-controlling connections are all in accordance with a well-known switching-system.

A suitable number of series-connected accelerating resistances are used, as indicated at R10, R11, R12 and R13. The resistance R10 is disposed between the supply-line 18 and the first armature-terminal T1, and this resistance R10 is shorted out by means of a second line-switch LS2. The resistance R11 is in series between the intermediate connection or terminal X2 and an intermediate connection-point X3, which is connected to the terminal T4 through the parallel-connection switch G; and said resistance R11 is progressively reduced or shorted out by means of any desired number of switch-contacts of which only R1 and R7 are shown. The resistance R12 is in series between the intermediate terminal X5 and an intermediate connection-point X4, which is in turn connected to the terminal T1 by the parallel-connection switch M; and said resistance R12 is progressively reduced or shorted out by any desired number of switch-contacts, of which only R2 and R8 are shown. The resistance R13 is in the series-motor connection, which is made between the points X3 and X4 by the switch JR, and this resistance R13 is finally shorted out by a transition-switch J, which makes a connection between the intermediate connection-points X2 and X5, for obtaining the full-series power-circuit connection of the motors.

Dynamic-braking circuits are established by opening the two power-switches LS1 and G1, and closing a braking-switch B1 in addition to the two parallel-connection switches M and G, also in accordance with a well-known system or arrangement. The braking-switch B1 provides a common dynamic-braking circuit-connection X6, X7, X8, X9 and X10 between the armature-terminals T3 and T2 of the two series-motor means, thus providing two dynamic-braking circuits wherein the motor-armature or armatures of each of said series-motor means are loaded by the field winding or windings of the other one of said series-motor means, in series with one of the accelerating resistances R11 and R12.

During both series and parallel motor operation, and also during dynamic braking, the switch-contacts R1, R2, R7 and R8 are successively or progressively closed in any manner which is suitable for progressively reducing the resistances. During parallel motor operation, after all of the accelerating resistances R11 and R13 have been cut out, the field-strengths of the motors are progressively reduced, to provide shunted-field operating-conditions.

In accordance with a usual arrangement, the motor-fields are reduced by equipping each of the series field windings SF1 and SF2 with a field-shunt, comprising an inductive reactor SX1 and SX2, as the case may be, and a variable resistor SR1 or SR2, respectively. The field-shunts SX1–SR1 and SX2–SR2 are first connected in parallel relation to their respective field-windings SF1 and SF2, by means of contact-terminals C11 and C10, respectively, of any suitable progressively or sequentially operating field-controlling means, which is herein illustrated as an electrically operated drum-type field-controller FC. After the respective field-shunts have been connected into operation, the field-shunt resistances SR1 and SR2 are then progressively shorted out by successive controller-points, of which only C13 and C17 are shown for SR1, and only C12 and C16 are shown for SR2, as the field-controller FC is moved from its initial full-field position FF, through its intermediate positions, of which only F1 and F3 are shown, to its shunted-field position SF, at which point the field-winding currents are reduced to about 40% of their unshunted values.

During dynamic braking, the braking-switch B1 connects the two motors through the common dynamic-braking circuit-connection X6 to X10, which contains a five-part braking-resistance R14 which is not a part of the motor-accelerating circuit. This braking-resistance R14 is used, in addition to the previously mentioned accelerating-resistances R11 and R12, in establishing the complete dynamic-braking circuits. The braking-resistance R14 is progressively reduced in value, by means of a suitable operation of braking-switches B2 to B5, in addition to the main braking-switch B1, during the dynamic-braking operation, and after the braking-resistance R14 has been reduced in value as much as it is going to be reduced, by the braking-switches B1 to B5, the acceleration-resistances R11 and R12, or portions thereof, are progressively shorted out, or reduced in value, by the acceleration-switches R1, R2, R7 and R8.

The progressive operation of the various resistance-shorting switches, during both motoring operation and dynamic braking, is under the automatic control of a suitable limit-relay CR, which is energized to be controllably responsive to conditions which accompany current-increments in the motor. Such a limit-relay is illustrated, in Figs. 1A, 1B and 1C, in the form of a single current-relay CR which is provided, in accordance with my present invention, with at least four operating-coils, namely the previously mentioned series coil CR, a kick-coil KC, a spot-coil SC, and a rate-coil RC, all acting cumulatively to cause a relay-response. The series soil CR is a one-turn current-coil which is serially connected between the points T2 and X1 in the motor-accelerating part of one of the motor-circuits, as is well-known. The kick-coil KC is a multiturn shunt relay-coil which is connected across the terminals T3 and X5 of the series main-field winding SF2 of the other motor-circuit, with a variable resistor R15 connected in series with the kick-coil KC for recalibrating purposes, as will be subsequently described. The spot-coil SC is a multiturn braking-current coil which is energized across a portion 22–T2 of the braking-resistance R14, as will be subsequently described. The rate-coil RC is a multiturn battery-energized coil which is con-trolled for recalibration purposes during motoring and braking, as will be subsequently described.

As shown in Fig. 1B, this limit-relay CR has a back-contact 66, which is normally closed, in the non-actuated or low-current position of the relay, and it also has a make-contact 67, which is closed when the relay-excitation is considerably higher than that which is necessary to open the back-contact 66.

All of the electrically controlled relays and switches which are shown in the drawing are diagrammatically indicated as having vertical switch-stems (indicated by dotted lines), which are biased by gravity toward their lower most positions, and all of these relays and switches are shown in their deenergized or non-actuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

Energy for the various relay-circuits or control-circuits is provided by means of a battery B on each car, as shown at the top left corner in Fig. 1A. The negative terminal (−) of the battery is permanently grounded, to constitute the negative bus (−) of the relay-circuits; while the positive terminal of the battery is connected, through a battery-switch BS, to the positive bus (+) of the relay circuits.

The exemplary field-controller FC, which is illustrated in the top left portion of Fig. 1A, consists of a drum C20, carrying six contact-segments C21 to C26. The segment C21 engages the field-terminal F2 and the odd-numbered controller-contacts C11 to C17 in the previously described field-shunting progression, while the segment C22 engages the field-terminal F4 and the even-numbered controller contacts C10 to C16, in the previously described field-shunting progression. The segment C23 engages two controller-circuits C2 and C2 in the full-field position FF of the field-controller FC. The segment C24 engages two controller-circuits C3 and C4 in the controller-positions FF through F3. The segment C25 engages two controller-circuits C1 and C2 in the full-field position F1 through SF; and these controller-circuits C5 and C6 are connected to adjustable intermediate tap-points C5 and C6 on the kick-coil resistor R15. The segment C26 engages two controller-circuits C7 and C8 in the controller-positions FF through F3, maintaining this connection to a point a little further beyond the position F3 than the segment C24.

The drum C20 of the field-controller FC is operable to its full-field position FF by any suitable means, which is simply illustrated in the form of a solenoid or magnet-coil FC–FF, which is energized between ground and a controller-circuit C9. The drum C20 is operable to its shunt-field position SF by any suitable means which is illustrated as a solenoid or magnet-coil FC–SF, which is energized between ground and the controller-circuit C7. The drum C20 remains in its set position, if neither of its coils FC–FF or FC–SF is energized, or if both of said coils should be energized simultaneously.

At the top of the main motor-circuits in Fig. 1A, I show the supply-circuit 18 as being used to energize a line-relay LR through a back-contact 19 of the second line-switch LS2. This line-relay LR picks up when an adequate line-voltage appears on the supply-conductor 18. This line-relay has a make-contact 20 which bypasses the LS2 back-contact 19 when the line-relay is energized.

The braking-current-responsive circuit 22–T2, which is shown immediately below the main motor-circuits in Fig. 1A, is energized from a tap-point 22 in the last section of the braking-resistance R14, so that this circuit 22–T2 is not energized except when a braking circuit is established.

Thus, in accordance with my present invention, I provide a braking-current-responsive circuit extending from the conductor 22 through a make-contact 23 of the braking-circuit contactor B5, and thence through a circuit 24 to a hold-coil M-Hold of the parallel-connection switch M, then to a circuit 25, and finally through a back contact 26 of the ground-switch G1, to the conductor T2. Connected between the circuit-points 24 and 25, there is also a hold-coil G-Hold of the parallel-connection switch G. These two hold-coils M-Hold and G-Hold are intended to be symbolic of any means which will hold their respective switches or contactors closed after they are once closed by other means (to be subsequently described), but which will not close or energize these switches from a deenergized position.

Also in accordance with my present invention, another braking-current-responsive circuit is shown as extending from the conductor 22, through a back-contact 27 of a brake-actuator BA which will be subsequently described, and thence through the spot-coil SC of the limit-relay CR, to the circuit T2. This is for the purpose of energizing the spot-coil SC only during the "spotting" operation.

A final braking-current-responsive circuit is also shown, extending from the conductor 22, through the magnet-coil LOM of a subsequently described lock-out magnet, and thence through a back-contact 28 of the resistance-shorting switch R8, to the circuit T2.

The kick-coil resistance R15 is provided with a terminal 29 at the end of the resistance which is closest to the tap-point C6, and this terminal 29 is shown as being connected, through a back-contact 30 of the second line-switch LS2, to the aforesaid tap-point C6.

The various electrical control-circuits for a train are under the control of a number of trainline wires, which extend from car to car, throughout the entire length of the train (not shown). As shown at the bottom of Fig. 1A, each car is provided with two couplers 31 and 32, one coupler at each end, these couplers being used for making drawbar connections with other cars of a train, and also being used for making various trainline wire-connections, such as connections for certain trainline wires, 21, 1, 2, 4, 6, 7, and GS, to use their customary designations, and also being used for making various air-connections, such as connections for a so-called "straight-air" pipe SA which is provided on each car. Connected in series with the trainline wire 21, in each car, are one or more door-interlocks DI, which are closed by the closure of the respective doors on the car. The respective couplers 31 and 32 are provided with coupler-switches CS1 and CS2, respectively, which are closed when the corresponding coupler is uncoupled, and which are opened when the corresponding coupler is coupled to a coupler of another car. These coupler-switches CS1 and CS2 are used to connect the trainline wire 21 to either one of two conductors 33 or 34, corresponding to the couplers 31 and 32, respectively.

Each end of each car is provided with a motorman's master controller MC, only one of which is indicated in the drawing, namely the controller which is connected to the wire 33. Since the only master controller which is used, either in a single car or in a multiple-unit train consisting of a plurality of cars of the type herein illustrated, is the controller at the front end of the car or train, the master controller MC which I have illustrated is assumed to be at the front end of the car, if the car is being operated by itself, or at the front end of the train, if the car is being operated at the front end of a multiple-unit train. The master controller at the other end of the car is not illustrated, in Fig. 1A, as it is a duplicate of the master controller MC at the front end, with the understanding that the master controller at the rear end will remain in its off position.

Each master controller MC consists of a reverser drum RD and a main drum MD.

The main drum MD is provided with two contact-segments MD1 and MD2, and this drum is provided with an off-position and three on-positions numbered 1, 2 and 3.

The reverser drum RD has an off-position, centered between forward and reverse positions. In its off-position, the reverser drum RD connects the wire 33 or 34, as the case may be, to the positive bus (+). In either its forward or reverse position, this reverser drum RD connects the wire 33 or 34, as the case may be, to a wire 35, which extends through the operating coil DR of a door-relay DR, and thence extends on, to the negative bus (−). The result of this arrangement is that the master controller at the rear end of the train will have its reverser drum RD in the off position, and the corresponding coupler-switch CS2 will be closed, so that that end of the trainline wire 21 will be connected to the positive bus (+) of the rear car. If all of the door-interlocks DI are closed, throughout the length of the train, this positive energization of the trainline wire 21 will extend on, to the front end, where the coupler-switch CS1 will again be closed, and the door-relay DR will be energized at 35, subject to a closed position of all of the doors of the train.

The door-relay DR has a make-contact 36, which is connected between the trainline wire 6 and a conductor 14, which will be subsequently described. This door-relay contact 36 is also bypassed by a push button PB which is within convenient reach of the motorman, from his station in front of the master controller MC, so that, in an emergency, if one of the doors of the train is open, and cannot be closed, the motorman can obtain control-power by depressing the push button PB, thus completing a circuit between the conductors 6 and 14. As soon as the push button PB is closed, and as soon thereafter as the main drum MD of the master controller is moved from its off-position to any on-position, the trainline wire 6 will be energized, and hence the conductor 14 will be energized. A push-button hold-coil PB–Hold is energized, between the conductor 14 and the negative bus (−), so as to hold the push button closed until the conductors 6 and 14 are again deenergized by a return of the main drum MD to its off-position, which deenergizes the trainline wire 6, as will be subsequently described.

In either its forward or reverse position, the reverser drum connects the positive bus (+) to a wire A+, which leads to one of the contact-terminals of the main-drum segment MD1.

The reverser drum RD also receives energy from an auxiliary positive bus B+ which extends from a contact-terminal of the main-drum segment MD2. In the forward position of the reverser drum, this auxiliary positive bus B+ is connected to the trainline wire 1; and in the reverse position of the reverser drum, this auxiliary positive conductor B+ is connected to the trainline wire 2.

The main-drum contact-segment MD1 has three terminals, in addition to the terminal of the aforesaid positive wire A+. In the first, second and third on-positions of the main drum MD, this contact-segment MD1 energizes the trainline wire 6; in the second and third positions of the main drum MD, the segment MD1 energizes the trainline wire 4; and in the third position of the main drum MD, the segment MD1 energizes the trainline wire 7.

In the off-position of the main drum MD, no circuit-contacts or connections are made; but in the first, second and third on-positions of this drum, the second segment MD2 connects the wire 14 to the auxiliary positive conductor B+ and also to the trainline wire GS. It is to be noted, however, that, during the on-movement of the main drum MD, the segment MD1 energizes the trainline wire 6 from the auxiliary positive conductor A+, and the segment MD2 energizes the auxiliary positive conductor B+ from the wire 14, both of these connections being made slightly before the segment MD2 energizes the trainline wire GS. Contrariwise, during the off-movement of the main drum, in passing from the No. 1 on-position to the off-position, the trainline wire GS is deenergized prior to the deenergization of the trainline wire 6, and also prior to the deenergization of the trainline wire 1 or 2, as the case may be.

Electrically propelled rapid-transit cars and multiple-unit trains are provided with air-brake equipments for stopping the car or train, unaided by dynamic braking, in an emergency, but normally operative only upon fade-out of the dynamic-braking force, when the dynamic braking has brought the car or the train nearly to a standstill, for then bringing the car or train to a complete stop. As shown at the bottom of Fig. 1A, a brake-valve BV is provided, for supplying compressed air at a controllably varied pressure to the "straight-air" pipeline SA when a "service" braking-operation is required, that is, when a substantial braking-force is to be applied to the car or train, as distinguished from the very small, usually negligible, braking-forces which are normally produced by the dynamic-braking circuits during the so-called "spotting" operation of the dynamic braking equipment, which will be subsequently described.

The pressure of the air in the straight-air pipe SA is responded to by a brake-actuator cylinder BA, which is connected to said straight-air pipe, and which is provided with a piston 37 which lifts a vertically illustrated dotted-line actuator-stem, also designated BA. Heretofore, this brake-actuator BA has been used to adjust the position of a brake-actuator rheostat, which is shown at BKG in the middle of Fig. 1C, so as to adjust the position of this rheostat in accordance with the severity of the braking operation which is called for by the position of the brake-valve BV, as will be subsequently described. In accordance with my present invention, I provide the brake-actuator BA with three electrical contacts 27 (Fig. 1A), 69 (Fig. 1B), and 140 (Fig. 1C), all of which are actuated as soon as the brake-actuator begins to move, in response to any on-position of the brake-valve BV. This use of suitable electrical switches or interlocks on the brake-actuator BA, according to my present invention, makes it possible for me to omit one of the relays which has previously been required in rapid-transit cars of this type, as will be subsequently explained in connection with the operation of my invention.

As has been common in previous dynamic-braking railway-cars, the straight-air pipe SA is connected to air-brake equipment of each car by means of a lock-out valve LOV, which is electrically closed, upon the energization of the lock-out magnet LOM, and which is released when the lock-out magnet LOM becomes substantially deenergized. In this way, when the so-called fade-out point has been reached, and the braking-force of the dynamic-braking circuits becomes very small, the air-brake equipment is brought into operation, to finish bringing the train to a complete standstill.

At the top of Fig. 1B, it will be noted that I have illustrated a simplified or schematic version or representation of a reverser-relay RR, which is shown as being provided with a forward-switch FOR, and a reverse-switch REV, which are mechanically joined by a lever 38, which causes one switch to be up while the other is down. These forward and reverse switches may be regarded as carrying main-circuit contacts which constitute the diagrammatically indicated field-reversers FR1 and FR2 which are shown in the main-circuit diagram in Fig. 1A.

In Fig. 1B, I have shown the reverser-relay RR in the position which it occupies for producing a forward movement of the car or train. I have shown control-circuits including a connection from the trainline wire 2 through a closed interlocking contact 39 on the forward-switch FOR, to the reverse-swtich operating-coil REV, and thence on, to a circuit or conductor 40. I have also shown a connection from the trainline wire 1 through the forward-switch operating-coil FOR to an open interlocking contact 42 on the reverse-switch REV, and thence on, to the conductor 40. This conductor 40 is then connected to the negative bus (—) through a back-contact 41 of the line-switch LS1. It will be noted that, before the reverse-switch RR was moved to its illustrated forward-position, the reverse-switch contact 42 was closed, so that, when the trainline wire 1 was first energized, the forward-switch coil FOR was momentarily energized, long enough to properly adjust the position of the reverse-relay RR, before the energizing circuit was opened by the opening of the reverse-switch contact 42.

The first on-position of the master controller MC, in Fig. 1A, is a train-switching position, in which the car or train is slowly moved, at its minimum speed, for moving the car or train for short distances. In this No. 1 controller-position, either the control-wire 1 or 2 is energized, depending upon the desired direction of train-movement, and the control-wires GS and 6 are also energized.

As shown in Fig. 1B, a circuit is provided from the control-wire 1, through a closed interlock 43 on the forward-switch FOR, to a conductor 44, and another circuit is provided between the non-deenergized control-wire 2, and a now-open interlock 45 on the reverse-switch REV, to the aforesaid conductor 44. This conductor 44 energizes an exciting-circuit which first extends through the operating coil LS1 of the line-switch LS1, then extends through a back-contact 46 of the brake-switch B1, a make-contact 47 of the line-relay LR, a back-contact 48 of the brake-switch B4, a circuit 49, a back-contact 50 of the parallel-connection switch M, and a back-contact 51 of the parallel-connection switch G, to the negative bus (—). A hold-circuit is also provided, between the circuit 49 and the negative bus (—), through a make-contact 52 of the line-switch LS1.

In accordance with my present invention, the next circuit which is shown in Fig. 1B is a circuit-connection 53 from the positive bus (+) through a back-contact 54 of the ground-switch G1, to a power-off switching-circuit 55.

In accordance with a joint invention of Norman H. Willby and myself, as set forth in our application Serial No. 669,550, filed July 2, 1957, a backwardly extending circuit is next provided, from the power-off relaying-circuit 55 to the controller-terminal C3 of the field-controller, for the purpose of causing the contact-segment C24 of the field-controller FC, in Fig. 1A, to be in series with a hold-line C4, in the field-controller positions FF through F3.

In the order in which the circuits are shown in Fig. 1B, the next circuit is a connection from the trainline wire 4, through a make-contact 56 of the line-switch LS1, to a control-circuit 57 which will be subsequently referred to. It will be recalled that the trainline wire 4 was first energized in the No. 2 on-position of the main drum of the master controller MC. This is the master-cotnroller position in which it is desired to initiate the progressive operation of the resistance-reducing switches in the series motor-connection of the traction motors A1 and A2, in order to smoothly accelerate the car or train.

It will be noted, from Fig. 1B, that I have provided a second energizing-circuit, for the control-circuit 57, which extends back from the power-off switching-circuit 55, and which includes a back-contact 58 of the ground-switch G1. This energizing-branch of the control-circuit 57 is used during the dynamic-braking operation, as will be subsequently explained.

The next circuit shown in Fig. 1B is an energizing-circuit from the trainline wire GS to the operating coil G1 of the ground-switch G1, and thence to the negative bus (—).

Next comes a circuit from the trainline wire 6, through a make-contact 59 of the line-switch LS1, to a conductor 60, and thence on, through a make-contact 61 of the ground-switch G1, to a power-on switching-circuit 62, From this power-on switching-circuit 62, a connection extends back, or to the left, through a back-contact 63 of the parallel-connection switch G, and a back-contact 64 of the transition-switch J, to a conductor 65, which energizes the operating-coil JR of the series-motor switch JR.

Referring back again to the control-circuit 57, it will be noted that this circuit extends down to a point where it is connected to the two contacts 66 and 67 of the limit-relay CR. The contact 67 is a limit-relay make-contact, which completes a circuit from the conductor 57 to a conductor 68. In accordance with my present invention, the circuit from this conductor 68 extends through a back-contact 69 of the brake-actuator BA, and a back-contact 70 of the second line-switch LS2, to the controller-circuit C8, which is connected, by the field-controller segment C26 in Fig. 1A, to the controller circuit C7, in all positions of the field-controller FC except the full-shunted-field position SF. It will be recalled that the controller circuit C7 energizes the field-controller magnet-coil FC–SF, which moves the field-controller drum C20 toward the shunted-field position SF.

The limit-relay contact 66 is a back-contact, which completes a circuit from the conductor 57 to a conductor 71, referred to below.

Referring now to the conductor 60 in Fig. 1B, it will be noted that this conductor has a branch extending downwardly to a backwardly or left-extending circuit, through a make-contact 72 of the series-motoring switch JR, to a circuit 73, which extends on, still further backwardly, or to the left, to connect with the controller wire C9 which energizes the full-field magnet-coil FC–FF (Fig. 1A), for moving the field-controller drum C20 to its full-field position FF.

Next, in Fig. 1B, the conductor 71 is shown as having a backwardly or leftwardly extending connection 71, which passes through a back-contact 74 of the line-switch LS1, to the aforesaid circuit 73 which is connected to the full-field controller-conductor C9. This circuit 73 also has a downwardly extending branch 73, for purposes which will be explained in connection with Fig. 1C.

Next, in Fig. 1B, another leftwardly extending branch of the circuit 71 is shown as passing through a make-contact 75 of the brake-switch B5 to a progress-wire 76, which is used, during dynamic braking, in the progressive control of the resistance-shorting switches R1 to R8.

Fig. 1B next shows a second energizing-circuit for the progress-wire 76. This second circuit extends back (or leftwardly) from the conductor 71 to a make-contact 77 of the ground-switch G1, and thence to a conductor 78, which extends on leftwardly, until it connects to the progress-wire 76. This progress-wire 76 is used, during the acceleration of the traction motors, in the progressive control of the second line-switch LS2, the resistance-shorting switches R1 to R8, and the transition-switch J.

The conductor 78, in Fig. 1B, has a downwardly extending connection, which extends to the left, through a make-contact 79 of the series-motoring switch JR, and then through a back-contact 80 of the second line-switch LS2, to an energizing-circuit 81 which energizes the operating-coil LS2 of said second line-switch LS2. A hold-circuit is also provided, for energizing the conductor 81 of the line-switch LS2, through an LS2 make-contact 82, which receives its energization from the previously mentioned conductor 60.

Just below the middle of Fig. 1B, there is shown a circuit extending from the progress-wire 76 through a make-contact 83 of the LS2 switch, to a conductor 84, and thence through a back-contact 85 of the first resistance-switch R1 to a conductor 86, and thence through the operating-coil R1 of this switch to a conductor 87, and finally through a make-contact 88 of the series-motoring switch JR to a conductor 89, which will be subsequently referred to. The LS2 contact 83, at the beginning of this circuit, closes, with the closing of the second line-switch LS2, at the beginning of the motor-accelerating progression. This contact 83 is bypassed by a make-contact 90 of the braking-switch B1, so as to reenergize the progression-circuit 84 to the first resistance-switch R1, at the proper time during the dynamic-braking progression, as will be subsequently pointed out.

Next, in Fig. 1B, there is shown a circuit 91 from the positive bus (+) through a make-contact 92 of the line-switch LS1 to a conductor 93, then through a make-contact 94 of the line-switch LS2 to a hold-wire 95, and finally through a make-contact 96 of the first resistance-switch R1 to the energizing-circuit 86 of this switch.

As shown in Fig. 1B, the progression continues, from the progress-wire 76, through a make-contact 97 of the resistance-switch R1 and a back-contact 98 of the resistance-switch R2, to a conductor 99, and thence through the operating-coil of the resistance-switch R2 to the previously mentioned conductor 87, and then through a make-contact 100 of the parallel-connection switch G to the previously mentioned circuit 89. Next is shown a circuit from the hold-wire C4 through a back-contact 101 of the line-switch LS1 to the previously mentioned hold-wire 95, and then through a make-contact 102 of the resistance-switch R2 to the energizing-circuit 99 of this switch.

A progress-connection is next made from the progress-line 76, through an R2 make-contact 103, an R7 back-contact 104, a circuit 105, and the R7 energizing-coil, to the circuit 87. In accordance with my present invention, a hold-circuit is provided from the control-circuit 57 through an R7 make-contact 106 to the energizing-circuit 105 of this R7 switch.

A progress-circuit is next shown, from the progress-wire 76, through an R7 make-contact 107, an R8 back-contact 108, a circuit 109, and the R8 energizing-coil, to the circuit 87. In accordance with my present invention, a hold-circuit is provided from the control-circuit 57 through an R8 make-contact 110 to the circuit 109.

In accordance with my invention, a circuit also extends to the left, from the bottom of the control-circuit 57 in Fig. 1B, to an LS1 back-contact 111, and thence to a conductor 112 which will be further mentioned in the description of Fig. 1C.

The bottom of the conductor 87 in Fig. 1B has a leftwardly extending extension, which leads through a make-contact 113 of the brake-switch B4 to the previously mentioned circuit 89, which is continued on, in Fig. 1C.

At the top of Fig. 1C, the circuit 89 is shown as continuing on, to the negative bus (−), through a back-contact 114 of the transition-switch J.

From the progress-line 76 in Fig. 1C, a circuit next extends through an R8 make-contact 115 to a conductor 116, in accordance with my present invention. A second energizing-circuit for this conductor 116 is also provided, extending to the left from the power-on switching-circuit 62 through a make-contact 117 of the transition-switch J, to said conductor 116. A circuit from said conductor 116 then extends on, to the left, through a back-contact 118 of the parallel-connection switch M, and through a back-contact 119 of the braking-switch B1, to a conductor 120 which energizes the operating-coil J of the transition-switch J.

A branch-circuit is next shown, in Fig. 1C, extending from the conductor 112 of Fig. 1B, and passing through an R7 back-contact 121 to a circuit 122, this branch-circuit being effective during the dynamic-braking operations.

A circuit is next shown, in Fig. 1C, extending from the trainline wire 7, which is energized, in the third on-position of the master controller MC in Fig. 1A, for the purpose of initiating the parallel motor-connection in the accelerating control or power-operation of the traction motors A1 and A2 of Fig. 1A. This branch-circuit extends from the wire 7 through a back-contact 123 of the last accelerating-resistance switch R8, and a make-contact 124 of the transition-switch J, to the previously mentioned conductor 122.

The circuit 122 extends on, through a JR back-contact 125 to a conductor 126, and thence through a make-contact 127 of the parallel-connection switch G to a circuit 128. Another connection is made from the conductor 126, through a back-contact 129 of the resistance-switch R1, to said conductor 128. This conductor 128 constitutes an energizing-circuit for energizing both the G-coil and the M-coil of the two parallel-operation switches G and M. A hold-circuit is also provided, extending to the left from the bottom of the power-on switching-circuit 62, and thence through a make-contact 129' of the M-switch, to the previously mentioned conductor 126.

It will be observed that, before the parallel-connection switches M and G were closed, during the power-operation of the motors, the transition-switch J had to be closed, as will be seen from its interlock 124; and it will be further observed that, when this transition-switch J closed, it opened up the series-motoring switch JR, at the J-interlock 64 in Fig. 1B, and it opened up all of the resistance-switches R1 to R8, at the J-interlock 114 in Fig. 1C. The progressive operation of the resistance-switches R1 to R8 then commenced all over again, from the progress-wire 76 in Fig. 1B, the negative circuits of the coils R1 to R8 being completed through the G-interlock 100, in Fig. 1B.

It will be observed, however, that when the parallel-connection switches M and G are closed during the braking-operation of the motors (through the R7 interlock 121 in Fig. 1C), the above-described progression of the resistance-switches R1 to R8 will not commence immediately, because the first progression will be established through the control of the brake-switches B1 to B5, as will be subsequently described.

The next control-circuit in Fig. 1C extends from the bottom of the progress-line 76, and continues through a make-contact 130 of the parallel-connection switch M and a make-contact 131 of the last resistance-switch R8, to the field-controller circuit C7 which energizes the shunt-field coil FC–SF of the field-controller FC in Fig. 1A. During the motoring operation, this energization of the shunt-field coil FC–SF occurs at the end of the full-field parallel-connection acceleration, and it initiates the progression of the field-controller FC from its full-field position FF to its shunt-field position SF. However, during the dynamic-braking operation, this energization of the shunt-field controller-coil FC–SF occurs at fade-out, and it produces no controller-movement, because the full-field controller-coil FC–FF is being simultaneously energized, through the C9 circuit which extends from the conductor 73 in Fig. 1B.

In Fig. 1C, a branch-circuit 93 extends down, from the conductor 93 in Fig. 1B, and is used to energize an energizing-circuit 132 of the rate-coil RC of the limit-relay CR, through a weight-controlled rheostat WT, and an adjustable resistance R16. This rate-coil energizing-circuit, which includes the weight-responsive rheostat WT, is energized when the circuit 93 is energized, and it will be seen, from Fig. 1B, that this circuit 93 is energized from the positive wire 91 as soon as the power-operation of the motors is initiated, as supervised by the LS1 interlock 92. The weight-responsive rheostat WT is a known device, which is automatically adjusted according to the variable weight or live load carried by the car, so that the rate-coil RC is the more strongly excited during light-weight conditions, during the accelerating progression of the motors, thus controllably reducing the minimum-current setting at which the limit-relay CR picks up and opens its back-contact 66 (Fig. 1B) during the power-operation of the motors. This is a well-known, and practically necessary, expedient, the operating mechanism thereof being symbolically indicated by the letters WT.

In Fig. 1C, a second energizing-circuit is provided for the conductor 132 of the rate-coil RC. This second energizing-circuit extends back, to the left, from the power-off switching-circuit 55, which is energized only when the power-operation of the traction-motors A1 and A2 of Fig. 1A is deenergized, as indicated by the G1 interlock 54 in Fig. 1B. In Fig. 1C, therefore, a circuit is provided, which extends to the left, from the power-off switching-circuit 55, through a back-contact 133 of the ground-switch G1, to a braking-responsive rheostat BKG, and thence through an adjustable resistance R17 to the energizing-circuit 132 of the rate-coil RC. The resistance-adjusting contact-arm of the braking-responsive rheostat BKG is moved by the brake-actuator BA, in an amount which is dependent upon the amount of braking which is called for by the brake-valve BV (Fig. 1A), which controls the air-pressure in the straight-air pipe SA, to which the brake-actuator cylinder BA is connected, as shown in Fig. 1A. This braking-responsive rheostat BKG has its resistance automatically increased in response to the amount of brake-application called for by the brake-valve BV, so that the rate-coil RC has its maximum dynamic-braking excitation when a low braking-rate is called for, thus providing a low minimum-current setting at which the limit-relay CR picks up and opens its back-contact 66 (Fig. 1B) during dynamic braking.

The next control-circuit in Fig. 1C shows how the brake-switch B1 is energized, in order to initiate dynamic braking. Thus, near the bottom of the power-off switching-circuit 55, a leftwardly extending branch-circuit extends through an R2 back-contact 134 and a B4 back-contact 135 to a circuit 136, which is extended through the operating-coil B1 of the brake-switch B1 to a circuit 137, the negative connection of which is completed through a subsequently described back-contact 152 of the brake-switch B4. It will be observed that this braking-circuit is not normally established until the main drum MD of the master controller MC is moved to its off-position in Fig. 1A. This off-movement of the master controller first causes the opening of the ground-switch G1, and later the opening of the line-switches LS1 and LS2. The opening of the G1 switch opens the interlock 61 in Fig. 1B, thereby deenergizing the holding-circuit 62—129' (Fig. 1C) of the two parallel connection-switches M and G, and also deenergizing the holding-circuit 62—117 (Fig. 1C) of the transition-switch J, and also deenergizing the energizing-circuit 62—63—64 (Fig. 1B) of the series-connection switch JR. Thus, whichever of these switches M, G, JR or J had been closed are opened, thus opening all of the resistance-switches R1 to R8, at either the JR interlock 88 (Fig. 1B), or the G interlock 100 (Fig. 1B). The opening of the resistance-switch R2 energizes the B1 switch, through the R2 interlock 134 (Fig. 1C). Meanwhile, the line-switch LS1 is open, and when it opens, it energizes the parallel-connection switches M and G, through the LS1 interlock 111 (Fig. 1B).

These operations result in the closure of the switches M, G and B1, thus establishing the dynamic-braking circuits, with all of the braking-resistance R14, and all of the accelerating resistances R11 and R12 in circuit, thus producing a very small braking-current, and a very small braking-force, which is normally negligibly small and which makes it feasible to establish a very weak dynamic-braking circuit in readiness for a "service" application of dynamic brake, as will be subsequently described. This weak operation of dynamic brake is called "spotting." During the spotting-operation, the spot-coil SC (Fig. 1A) of the limit-relay CR is energized, from the tapped portion 22—T2 of the dynamic-braking resistance R14, and the field-controller is caused to progress, in one direction or the other, under the control of the make and break contacts 67 and 66 (Fig. 1B) of the limit-relay CR, in order to "spot" the operating-conditions of the dynamic-braking circuit in accordance with the speed of the car, so that, if and when a "service" braking-operation is called for, the "service" dynamic-braking conditions may be entered into smoothly and without overshoot.

Returning, again, to Fig. 1C, it will be noted that the bottom of the power-off switching-circuit 55 has a leftwardly extending branch-circuit which extends through a B5 make-contact 138 and a B1 make-contact 139, to the energizing-circuit 136 of the B1 relay, thus establishing a hold-circuit therefor.

Next, in Fig. 1C, there is shown a circuit from the wire 73 of Fig. 1B, extending through a make-contact 140 of the brake-actuator BA, to energize the field-controller circuit C2, and hence the progress-wire C1 when the field-controller segment C23 is energized in the full-field position FF of the field-controller FC in Fig. 1A.

As has been previously stated, the three brake-actuator contacts 27, 69 and 140 are a novel feature of my invention, whereby a "service" dynamic-braking operation is initiated by the initial response of the brake-actuator cylinder BA at the bottom of Fig. 1A, in response to the movement of the brake-valve BV to any on-position. Thus, I avoid the necessity for using a separate electrically operated braking-relay, which was first shown in my Patent 2,318,330, of May 4, 1943, and which has been standard equipment in the dynamic-braking control of multiple-unit trans and rapid-transit cars. My brake-actuator interlock 27 in Fig. 1A disconnects the spot-coil SC of the limit-relay CR, thus increasing the current-setting of the limit-relay CR. Thereafter, each time the braking-current subsides to a value which is low enough to close the limit-relay back-contact 66 in Fig. 1B, a step in the service-braking progression is made, through the circuit 71—74—73. This braking-progression circuit is connected to the full-field controller-circuit C9, which notches the field-controller FC (Fig. 1A) toward its full-field position FF, and when the full-field position FF is reached, the controller-contact C23 energizes the progress-wire C1 from the controller-circuit C2, which is in turn energized, by the brake-actuator contact 140 (Fig. 1C), from this same braking-progression circuit 71—74—73 (Fig. 1B).

The next control-circuit which is shown in Fig. 1C is a branch-circuit which extends from the progress-wire C1 through a B1 back-contact 141 and a B3 make-contact 142 to the energizing-circuit 136 of the B1 switch.

Next, in Fig. 1C, there is shown a branch-circuit from the progress-wire C1, through a B5 make-contact 143 to a conductor 144. A second energizing-circuit for this conductor 144 is shown as extending from the progress-wire C1 through a B1 make-contact 145 to this conductor 144. This B1-interlock 145 constitutes the first resistance-reducing progression-step of a service-application of dynamic brake, so that the conductor 144 is energized in joint response to a closure of the braking-switch B1, a full-field position of the field-controller FC, and a closure of the limit-relay back-contact 66 (Fig. 1B) in the braking-progression circuit 71—74—73. As shown in Fig. 1C, the aforesaid conductor 144 is connected on, through a B2 back-contact 146, to a conductor 147, and thence to the B2 operating-coil, and to the previously mentioned circuit 137. A holding-circuit is immediately completed from the hold-line C4 through a B2 make-contact 148 to the conductor 147.

Fig. 1C next shows a branch-circuit from the progress-line C1 through a B3 back-contact 149 and a B2 make-contact 150 to a conductor 151, and thence through the B3 operating-coil to the previously mentioned circuit 137. This circuit 137 is connected to the negative bus (−) through two branch circuits, one including the B4 back-contact 152 and the other including a B5 make-contact 153. As soon as the B3 switch is actuated, it completes a holding-circuit from the hold-wire C4 through a B3 make-contact 154 to the circuit 151.

In Fig. 1C, the bottom of the progress-wire C1 is shown as being connected through a circuit which extends through a B5 back-contact 155 to a conductor 156. A connection is made from the conductor 156 through a B3 make-contact 157 and a conductor 158 to the B4 energizing-coil, and then to the negative bus (−). As soon as the B4 switch picks up, it energizes a holding-circuit from the hold-wire C4 through a B4 make-contact 159 to the aforesaid conductor 158.

The conductor 156, at the bottom of Fig. 1C, is also connected, through a branch-circuit which extends through a B2 back-contact 160, and a B4 make-contact 161, to a circuit 162, and thence through the B5 actuating-coil to the negative bus (−). As soon as the B5 switch closes, it closes a holding-circuit from the bottom of the hold-wire C4 in Fig. 1C through a B5 make-contact 163 to the conductor 162.

The operation of the illustrated circuit-connections, which have now been described, is shown in Fig. 2, which is a sequence chart which will suffice as a basis for explaining the novel features of my invention. The general plan of the sequence chart is well known to all who are familiar with the past practices of the art, in controlling both the power-operation and the dynamic-braking operation of traction-motors for electrically propelled railway-cars. As is customary in this sort of chart, a small circle indicates a closed position of a contact or an energized condition of a coil or circuit. I shall direct my explanation more particularly to the special features of my invention.

When the car is first being readied for operation, with reverser-drum RD of the master controller MC adjusted to either its forward or reverse position, with the main drum MD of the master controller MC in its off-position, and with no power on the supply-circuit 18 for the motors, as shown in step A of the sequence chart, the supply-line 18 will first be energized, thereby picking up the line-relay LR as shown in step B. The doors of the train will then be closed, closing all of the door-interlocks DI, and thus energizing the door-relay DR, as is indicated in step C of the chart.

The train is then ready for a power-operation, in which the brake-valve BV is moved to its off-position, and the main drum of the master controller MC is moved either immediately to its No. 3 on-position, or in a step-by-step manner to successive on-positions 1, 2 and 3, resulting in the well-known power-operation steps which are exemplified by steps P1 to P7, a transition step TR, and steps P8 to P15 in Fig. 2.

When the motorman wishes to discontinue the power-operation, he returns the controller through positions 2 and 1 to the off-position, resulting in steps PA, PB, C', D', E', F' and 1 of the illustrative sequence chart, which has been prepared on the assumption that the cutting off of power followed a full-parallel, shunted-field, operating-step P15, although it will be understood, of course, that the master controller could be returned to its off-position from any other step of the power-operation of the motors.

As long as the master controller is in any on-position, such as 2 or 1, as indicated by the steps PA and PB in the sequence chart, none of the previously closed motor-operating switches or contacts are disturbed, because they are all held by suitable holding-circuits which have been described.

It will be noted that, when the controller is moved from its No. 1 on-position, as shown in step PB, to its off-position, the trainline wire GS is first deenergized, as shown in step C' of the chart, and this deenergizes the coil of the ground-switch G1. When the ground-switch G1 opens, it deenergizes the main operating or closing-coils M and G of the two parallel-operation switches M and G through the G1 interlock 61, as shown in step D', causing these switches M and G to open. The opening of the switch G causes an opening of all of the resistance-switches R1 to R8, through the G interlock 100, as shown in step E' of the chart. The opening of the resistance-switch R2 causes an energization of the braking-circuit switch B1, through the interlock 134, as shown in step F', noting that the power-off switching-circuit 55 is now energized, through the G1 interlock 54.

Meanwhile, the master controller is continuing to move away from its No. 1 on-position toward its off-position. At some time before the off-position is fully reached, usually before the steps D' and E' of the sequence chart, but being shown, for convenience, as occurring after the step E', the trainline wire 1 or 2 and the trainline wire 6 will both be deenergized at the master controller, thereby deenergizing the line-switches LS1 and LS2, as shown in step F'. When the line-switch LS1 is open, its interlock 111 will energize the two parallel-connection switches M and G, thereby completing a dynamic-braking circuit, in the spot-step 1, and also energizing the spot-coil SC, as shown in Fig. 2. During the continuance of the spotting condition of the dynamic-braking circuits, the limit-relay CR touches its back-contact 66 whenever the spotting-current is undesirably small, thereby notching the field-controller FC toward its full-field position FF, through the progression-circuit 71—74—73—C9. This operation is shown in steps 1, 2 and 3 of the sequence chart.

If, now, the motorman desires a "service" application of dynamic braking, he moves the brake-valve BV to an on-position, moving it little or much, according to the amount of braking which he desires. As shown in step 4 of the sequence chart, this on-movement of the brake-valve BV results directly in actuating the brake-actuator BA from its deenergized position to an energized position. According to one feature of my present invention, the back-contact 27 of the brake-actuator BA thereupon opens and deenergizes the spot-coil SC, thus changing the current-setting of the limit-relay CR from a small value suitable for spotting, to a large value suitable for producing a serviceable amount of a dynamic brake. At the same time, the brake-actuator BA opens its back-contact 69, thereby ensuring the deenergization of the shunt-field coil FC-SF of the field-controller, even though the limit-relay make-contact 67 might momentarily close, thus preparing the way for the progress-circuit 66—71—74—73—C9 to begin notching the field-controller FC toward its full-field position FF, as shown in step 4, and thereupon introducing the resistance-reducing part of the dynamic-braking progression, through the circuit 66—71—74—73—140—C2—C23—C1, which is completed by the closure of the field-controller contact C23 and the brake-actuator contact 140.

During the remainder of the dynamic-braking operation, successive sequence-steps are taken, in a well-known manner, as shown at steps 4 to 15 of the sequence chart, each step being taken upon the subsidence of the braking-current to a value which is small enough to permit the limit-relay CR to close its back-contact 66.

When the last two braking-steps 14 and 15 are taken, the dynamic-braking operation has substantially reached its fade-out point, the braking effort being very small, and the car-speed being close to zero, perhaps something like three to five miles per hour. In step 15, the last resistance-switch R8 is closed, and its interlock 28 deenergizes the lock-out magnet LOM, thus opening the lock-out valve LOV and bringing the air-brake equipment into operation (or into stronger operation if it had been in limited operation), so as to bring the car to a complete standstill.

It is a desirable feature of my invention that the dynamic-braking circuits, such as are shown in the last braking-step 15 of the sequence chart, shall be substantially interrupted (or completely interrupted as I have shown it), before the car comes to a complete stop. Heretofore, after the fade-out of a dynamic-braking operation, it has required the application of power to the traction-motors A1 and A2, before the holding-circuits of the various switches in the dynamic-braking circuit could be released; and this has sometimes resulted in a very undesirable situation in the event that one of the cars in a multiple-unit train had blown a third-rail fuse 17, unknown to the operator at the head of the train, and if the operator had then made a "service" dynamic-braking operation after this condition existed. Then, when a power-application was thereafter made, on the rest of the cars of the train, it would be impossible to make a power-application on this car with the burnt-out fuse, with the result that the dynamic-braking circuits of that car would remain energized, in an advanced state of progression, while that car is being towed by the rest of the train. This has resulted in a burning out of the resistances in the dynamic-braking circuit, because these resistances are not designed with a current-time rating sufficient to withstand such sustained service.

In accordance with my invention, I provide a fade-out means which interrupts the dynamic-braking circuit in response to a reduction of the braking-current to a preselectable value, such as 25 amperes or less, at which the dynamic-braking force becomes very small. This small braking-current value is preferably adjusted to be smaller than that which closed the current-limit-relay back-contact 66 for the last time, so that this small current-value would be obtained during the period while the air-brake equipment was bringing the car to a complete stop, after the lock-out magnet LOM had been released by the last brake-switch R8.

There are a number of specific circuits or control-means whereby this final interruption of the dynamic-braking circuits could be obtained. Heretofore, at least since the introduction of the dynamic-braking system of the Riley Patent 2,597,183, it has been customary to provide a special relay, which has been variously called a brake-protective relay, or a brake-power relay, or other names, whereby to make sure that a power-operation has preceded a dynamic-brake operation, so as to make sure that there is enough residual magnetism remaining in the motors to secure a reasonably sure and rapid build-up of the braking-currents when a dynamic-braking circuit is established. In systems using such a brake-protective relay, said relay could be controlled, in accordance with my present invention, so as to deenergize this relay on fade-out, thus interrupting the dynamic-braking circuits and making it impossible to reestablish such circuits until there has been another power-operation of the traction-motors, as shown, for example, in my simultaneously filed companion-application, Serial No. 675,489, filed July 31, 1957, now U.S. Patent No. 2,933,667, granted April 19, 1960, entitled Dynamic-Brake Control-Systems.

It is one of the features of my present invention to devise a circuit-means whereby I can avoid the use of as many extra relays as possible. In my present invention, therefore, as shown in the accompanying drawings, I use a special circuit-combination of interlocks on the two power-circuit switches LS1 and G1, as a condition precedent to the establishment of a dynamic-braking circuit. Thus, I provide each of my parallel-connection switches M and G with a hold-coil or circuit, which is not able to close the switch, but which is able to hold the switch closed, once it has been closed. In the system which I have shown, the establishment of a dynamic-braking circuit is brought about by an off-position of the two power-operation switches LS1 and G1.

If, however, a service-application of dynamic brake should be obtained, the energization of the parallel-combination switches M and G is transferred from battery power to braking-current power, during the dynamic-braking progression. In the specific illustrated circuit, when the braking-switch B5 closes, in the braking-step 8 of the sequence-chart, the B5 itnerlock 23 energizes the hold-coils M-Hold and G-Hold from the braking-circuit-portion 22—T2, so as to supplement the action of the main M and G coils which hold these switches closed by battery-power; but when the fade-out point is substantially reached, as by the closure of the next-to-the-last resistance-switch R7, in step 14, the R7-interlock 121 opens and deenergizes the main coils M and G of these parallel-connection switches M and G for the brief remaining time in which the dynamic-braking circuit is in existence. The braking-current-energized hold-coils M-Hold and G-Hold keep these switches M and G energized, during the period when the car is being brought to a complete stop by the air-brake equipment, until the braking-current has been reduced to a value which is smaller than that which caused a pickup of the R8 switch and set the air-brake equipment into operation, in step 15 of the chart.

Thus, before the car comes to a complete stop, the braking-current energization of the M and G hold-coils M-Hold and G-Hold becomes too feeble to keep these switches energized, and these switches thereupon open their main contacts, thus interrupting the dynamic-braking circuit at M and G in the main-circuit diagram of Fig. 1A, as shown in the fade-out step of the sequence chart, Fig. 2.

The same general principal, of changing a suitable holding or energizing-circuit of an electrically responsive switching-element, from an initial constant-voltage energization, such as is obtained from the battery B, to a braking-current-responsive control, which finally drops to a very small value, before the car comes to a complete stop, is generally applicable, within the broad concept of my invention, whether it is applied to the parallel-connection switches M and G, or to a special brake-protective relay, or to any other means whereby this novel principle of operation may be embodied.

If, after fade-out, it is desired to again establish a power-operation of the motors, the motorman turns off the brake-valve BV and moves the master controller to any on-position, such as the No. 1 position which is shown in the transition-step TR1 of the sequence chart. The first movement of the controller energizes the trainline wires 1 (or 2) and 6, as shown in the step TR1, but no switching changes are made in the motor-circuits, because of the open B1 interlock 46 in the energizing circuit for the line-switch LS1. Immediately thereafter, the trainline wire GS is energized, thus energizing the ground-switch G1, as shown in step TR2 of the chart. When the ground-switch G1 picks up, it deenergizes all of the resistance-switches R1 to R8, and all of the braking-switches B1 to B5, because of the opening of the G1 interlocks 54 and 58, thus interrupting the braking-circuit connections, as shown in the step TR3 of the chart. The deenergization of the B1 switch energizes the line-switch LS1, through the B1 interlock 46, resulting in the circuit-condition shown in step TR4. The energization of the line-switch LS1 energizes the series-connection switch JR through the LS1 interlock 59, thus establishing a repetition of the first power-operation step P1, as shown on the chart.

Another desirable feature of my present invention is shown in the last five lines of the sequence chart, Fig. 2. It relates to a condition in which a door-interlock DI may have become open, or the continuity of the trainline wire 21 may have otherwise become impaired, deenergizing the door-relay DR, unnoticed by the motorman, while the master-controller is in one of its on-positions. In previous equipments, using a brake-power relay (which I have now eliminated) to make sure that a power-operation has preceded a dynamic-braking operation, and prior to the introduction of a so-called "door-brake" relay to correct the situation, as described in my copending application, Serial No. 642,742, filed February 27, 1957, entitled Traction-Motor Control, an unnoticed interruption of the door-relay circuit has resulted in a deenergization of the brake-power relay, so that, when the motorman attempted to obtain dynamic braking, he could get no dynamic-braking circuits, resulting in a hazardous train-operating condition.

In my present invention, as shown in the last five lines of the sequence chart, I have assumed that the train is operating in one of the power-operating steps, choosing the step P15 for illustrative purposes. I have assumed, in the next step, marked with an asterisk (*), that the opening of a door-interlock DI has resulted in a deenergization of the door-relay DR. The opening of the door-relay contact 36, in Fig. 1A, deenergizes the train-line wires 1 (or 2) and GS, as shown in step *, and this results in an opening of the two power-circuit switches LS1 and G1, as shown in the step *A. The opening of the power-switches LS1 and G1 results in the opening of the power-switch LS2, and all of the resistance-switches R1 to R8. This operation also results in the energization of the full-field coil FC-FF of the field-controller FC, through the circuit 53—54—55—58—57—66—71—74—73—C9. The result is momentarily the condition shown in step *B, in which all of the power-circuit switches are open.

As soon, however, as this occurs, the various interlocking circuits, which have been heretofore described, result in the establishment of a spotting circuit, as indicated by step *C in the sequence chart, wherein the operating coils M and G of the parallel-connection switches M and G are energized, the brake-switch B1 is energized, and the spot-coil SC is energized, usually causing the limit-relay CR to pick up so as to close its make-contact 67, thereby energizing the circuit 68—69—70—C8—C26—C7, which actuates the shunted-field coil FC-SF until the field-controller FC is adjusted to its position F3 in Fig. 1. This results in the immediate establishment of a spotting circuit-condition as shown in *C in the last line of the sequence chart, Fig. 2, without waiting for the motorman to turn off the master controller, and making a "service" braking-application obtainable.

By way of conclusion, I will quickly summarize the principal novel features of my present invention. I realize an appreciable saving in the cost of each equipment, in relays and wiring, and at the same time I obtain several novel operational advantages.

I omit a formerly used brake-power relay, by adding a hold-coil or circuit to the parallel-connection switches M and G (or other part of the "spotting" dynamic-braking circuit), and by rearranging the interlocking control-circuit connections so that a deenergized condition of the two power-operation switches LS1 and G1 will set up the dynamic-braking circuit through an interlock (such as 121) on one of the last two resistance-reducing switching-means which are actuated at substantially the fade-out point in the dynamic-braking progression. I rearrange the holding-circuit, for holding this fade-out switching-means in its energized position, through an out-interlock (such as 54) on one of the power-operation switches, preferably the switch G1 which is responsive directly to the trainline wire GS, so that a power-circuit operation of the traction-motors is normally required, to open this G1 interlock 54, before the dynamic-braking circuit can be again established after fade-out.

I avoid the necessity for a previously used brake-actuator, by providing interlocking contacts on the brake-actuator BA. The unobviousness of this seemingly simple expedient is shown by the history of the development and use of the brake-relay and the brake-actuator. The brake-relay was first introduced, as shown in my Patent 2,318,330, as a means for causing a "service" braking-operation to start simultaneously on each of the cars in a multiple-unit train; and the brake-actuator was used, at that time, to short out three successive taps on a resistor in series with a rate-coil on the limit-relay, according to the amount of air-pressure which was applied to the brake-actuator. Subsequently, as shown in Patent 2,523,143 of Riley and myself, a braking-responsive rheostat, similar to the rheostat BKG in my present application, was used, which could be smoothly changed in resistance, through many steps, and this rheostat was adjusted in position, dependent upon the amount of air-pressure, preferably by the use of the pressure-responsive brake-actuator. Subsequently, as shown in my Patent 2,669,679, an over-shooting-preventing means was added to the brake-actuator, to prevent this actuator from moving the adjustment-arm on the braking-responsive rheostat too fast and too far, upon the initial application of air-pressure to the brake-actuator, but still using a special brake-relay for synchronizing the initiation of a "service" dynamic-braking operation in all of the cars of a multiple-unit train. This brief history will show how, little by little, the concepts and uses of the braking relay and the brake-actuator have developed.

My present invention is based upon the known fact that the air-pressure in the straight-air pipe of any train varies so nearly simultaneously, in all of the cars of the train, that this air-pressure can be used to substantially simultaneously apply the air-brakes on all of the cars of the train, even in trains in which the braking power is obtained solely by the air-brake equipment, without any dynamic braking. This being the case, the initial responses of the brake-actuators on all of the cars of a multiple-unit train, regardless of the amount of braking which is called for by the air-pressure in the straight-air pipe, can be relied upon to initiate the "service" dynamic-braking progression in all of the cars of the train, in times which are so nearly identical that the operations can be regarded as being substantially simultaneous, for all practical purposes.

My new control-circuit interlocking-arrangements also dispense with the necessity for a door-brake relay, which was more recently introduced for the purpose of making possible a subsequent establishment of the dynamic-braking circuit, in the event that the power-operation of the traction-motors is interrupted while the master-controller is in an on-position. My use of the deenergized positions of the two power-circuit switches LS1 and G1, to establish the dynamic-braking circuits, makes it possible for me now to omit such a door-brake relay.

My present control-circuits, by incorporating certain improvements, also makes it possible for me to avoid the use of a separate spotting-relay, for controlling the spotting-operations in the dynamic-braking circuits, prior to the initiation of a "service" braking-operation. I do this, by adding the spot-coil SC (or its equivalent) to the limit-relay CR, and by adding the limit-relay make-contact 67, and rearranging the control-circuit connections. The history of the art shows that the use of a number of operating-coils on the limit-relay, including a spot-coil such as my coil SC, was known, with somewhat different control-circuit connections, in my Patent 2,318,330, but it gave such a rough build-up of the dynamic-braking force, upon the initiation of a "service" braking-operation, that the spotting control had to be separated, again, from the limit-relay operations, as shown in Patent 2,523,143 of Riley and myself.

Better control over the dynamic-braking build-up is now obtained, and overshoot, or rough braking-application are avoided, by adjusting the recalibrating resistance R15 in series with the kick-coil KC, on entering shunted-field operation, by means of the field-controller circuits C5 and C6 and the field-controller contact-segment C25, and a distinction is made in the amount of recalibrating resistance R15 that is used, during dynamic braking as compared to the normal motoring-operation, by means of the back-contact 30 on the second line-switch LS2. This recalibration control is shown and claimed in my above-mentioned copending application, Serial No. 642,742. Prior to that, other, less successful alternative means were devised, for preventing rough dynamic-braking build-up, as shown, for example, in Patent 2,748,335, granted May 29, 1956, to Fowler and myself. We now use our brake-actuator contact 27 for taking our spot-coil SC out of operation when a "service" braking-operation is called for.

In addition to simplifying and reducing the cost of my control-circuit, I have also achieved important functional or operational advantages, particularly in connection with an open-circuiting of the dynamic-braking circuits before the car reaches zero speed during brake fade-out, a provision for the necessity of a reestablishment of a power-operation before the dynamic-braking circuits can be again established after such a fade-out, and an immediate establishment of a "spotting" dynamic-braking circuit, without waiting for the master controller to be returned to an off-position, in response to the loss of the door-interlock circuit, or a deenergization of the door-relay DR, during the operation of the car or train; all as has been hereinabove described.

It will be understood that, in all such complicated control-circuit arrangements, such as are necessary for controlling the acceleration and the dynamic-braking of an electrically propelled car, there are a great many alternative and substantially equivalent circuit-expedients, which can be used, and which from time to time are used, for accomplishing essentially the same results by essential equivalents of the same circuit-means or expedients. While, therefore, I have illustrated my invention in but a single exemplary arrangement, and while I have greatly simplified this illustration by omitting many known features, some of which would be practically necessary in any competitively acceptable control-system, I wish it to be clearly understood that I am not altogether limited to the precise details of every illustrated connection; and that the broader aspects of my invention contemplate the possibility of the substitution of equivalents for one or more of the circuit-elements, the addition of other circuit-elements which have not been shown in my simplified drawings, and the omission of details or elements which may not be needed in some installations.

I claim as my invention:

1. A control-assembly for two direct-current series-motor means for a common load-device, each series-motor means including at least one motor-armature, and a series field winding or windings; said assembly including: a separate accelerating resistance for each of the series-motor means; a motor-accelerating means, for energizing said series-motor means, first in a series-motor connection and then in a parallel-motor connection, with said separate accelerating resistances in series with their respective series-motor means, said motor-accelerating means including a motoring-progression resistance-switching means for progressively reducing said accelerating resistances in successive steps; a dynamic-braking means, for establishing two dynamic-braking circuits wherein the armature or armatures of each of said series-motor means are loaded by the field winding or windings of the other series-motor means in series with one of said accelerating-resistance means, said two dynamic-braking circuits having a common dynamic-braking circuit-portion, said two dynamic-braking circuits including an amount of braking resistance which is not normally used in the motor-accelerating circuit, said dynamic-braking means including a braking-progression resistance-switching means for progressively reducing the amount of said braking resistance; a limit-relay means for delaying the aforesaid progressions in response to excessive motor-current conditions; a controller including an on-position means for actuating said motor-accelerating means, and an off-position means for actuating said dynamic-braking means; a braking-application control-means having an on-position and an off-position; a spotting-operation means, which is responsive to the off-position of the braking-application control-means, for interposing at least a partial block against the operation of said braking-progression means when said braking-application control-means is in its non-actuated position; a braking-operation means, responsive to the on-position of the braking-application control-means, for removing said block against the operation of said braking-progression means; other braking-means for bringing said series-motor means to a complete stop; a first fade-out means, which is responsive to the dynamic-braking current when a fade-out condition is substantially reached in the dynamic-braking operation, for automatically bringing said other braking-means into operation; and a subsequently operating second fade-out means, operative before said series-motor means comes to a complete stop, for rendering said dynamic-braking circuit incapable of again producing a substantial dynamic-braking effect in case said series-motor means should again be driven at a substantial speed without further change in said dynamic-braking circuit; said limit-relay means including a first current-responsive means which is responsive to the motor-current in a motor-accelerating portion of the motor-circuits, and a second current-responsive means which is selectively responsive to the dynamic-breaking current; said first current-responsive means being determinatively effective in controlling the motor-acceleration progressions and the braking-application progressions; and said second current-responsive means being determinatively effective in controlling the operation of said second fade-out means.

2. A control-assembly for two direct-current series-motor means for a common load-device, each series-motor means including at least one motor-armature, and a series field winding or windings; said assembly including: a separate accelerating resistance for each of the series-motor means; a motor-accelerating means, for energizing said series-motor means, first in a series-motor connection and then in a parallel-motor connection, with said separate accelerating resistances in series with their respective series-motor means, said motor-accelerating means including a motoring-progression resistance-switching means for progressively reducing said accelerating resistances in successive steps; a dynamic-braking means, for establishing two dynamic-braking circuits wherein the armature or armatures of each of said series-motor means are loaded by the field winding or windings of the other series-motor means in series with one of said accelerating-resistance means, said two dynamic-braking circuits having a common dynamic-braking circuit-portion, said two dynamic-braking circuits including an amount of braking resistance which is not normally used in the motor-accelerating circuit, said dynamic-braking means including a banking-progression resistance-switching means for progressively reducing the amount of said braking resistance; a limit-relay means for delaying the aforesaid progressions in response to excessive motor-current conditions; a controller including an on-position means for actuating said motor-accelerating means, and an off-position means for actuating said dynamic-braking means; a braking-application control-means having an on-position and an off-position; a spotting-operation means, which is responsive to the off-position of the braking-application control-means, for interposing at least a partial block against the operation of said braking-progression means when said braking-application control-means is in its non-actuated position; a braking-operation means, responsive to the on-position of the braking-application control means, for removing said block against the operation of said braking-progression means; other braking-means for bringing said series-motor means to a complete stop; a first fade-out means, which is responsive to the dynamic-braking current when a fade-out condition is substantially reached in the dyamic-braking operation, for automatically bringing said other braking-means into operation; and a subsequently operating second fade-out means, operative before said series-motor means comes to a complete stop, for substantially open-circuiting said dynamic-braking circuit; said limit-relay means including a first current-responsive means which is responsive to the motor-current in a motor-accelerating portion of the motor-circuits, and a second current-responsive means which is selectively responsive to the dynamic-braking current; said first current-responsive means being determinatively effective in controlling the motor-acceleration progressions and the braking-application progressions; and said second current-responsive means being determinatively effective in controlling the operation of said second fade-out means.

3. A control-assembly for two direct-current series-motor means for a common load-device, each series-motor means including at least one motor-armature, and a series field winding or windings; said assembly including: a separate accelerating resistance for each of the series-motor means; a power-switching circuit-means, for establishing a power-circuit for energizing said series-motor means, first in a series-motor connection and then in a parallel-motor connection, with said separate accelerating resistances in series with their respective series-motor means, said power-switching circuit-means including a motoring-progression resistance-switching means for progressively reducing said accelerating resistances in successive steps; a braking-switching circuit-means, for establishing two dynamic-braking circuits wherein the armature or armatures of each of said series-motor means are loaded by the field winding or windings of the other series-motor means in series with one of said accelerating-resistance means, said two dynamic-braking circuits including an amount of braking resistance which is not normally used in the motor-accelerating circuit, said two dynamic-braking circuits having an initial "spotting" braking condition in which very lttle braking-force is normally developed, said braking-switching circuit-means including braking-progression resistance-switching means for progressively reducing the amount of said braking resistance; a master controller including a plurality of on-positions and an off-position; a means for ensuring that at least one of the last of the braking-progression resistance-switching means, once it is actuated, will be released only when the master-controller is thereafter moved to an on-position; a control-circuit motoring-operation means, which is responsive to successive on-positions of the master controller, for initiating, and controlling successive stages in, the operation of said power-switching circuit-means; a control-circuit braking-initiating means, which is jointly responsive to an off-condition of said power-switch circuit-means, and to a released condition of said one of the last of the braking-progression resistance-switching means, for initiating the operation of said braking-switch circuit-means; a service-braking control-means which has an on-position and an off-position; a dynamic-braking control-means, which is responsive to an on-position of said service-braking control-means, for converting said braking-switching circuit means from said "spotting" braking condition to a "service" braking condition in which a substantial braking-force is normally developed under progressively controllable dynamic-braking conditions; and a means, which is jointly responsive to an on-position of said service-braking control-means and to the absence of a substantial braking-current in said dynamic-braking circuits, for opening said dynamic-braking circuits.

4. A control-assembly for two direct-current series-motor means for a common load-device, each series-motor means including at least one motor-armature, and a series field winding or windings; said assembly including: a supply-circuit for the motor-means; a power-availability relay, for indicating the existence of available power in a predetermined portion of said supply-circuit; a separate accelerating resistance for each of the series-motor means; a power-switching circuit-means, for establishing a power-circuit for energizing said series-motor means, first in a series-motor connection and then in a parallel-motor connection, with said separate accelerating resistances in series with their respective series-motor means, said power-switching circuit-means including a motoring-progression resistance-switching means for progressively reducing said accelerating resistances in successive steps, said power-switching circuit-means including two separate power-circuit contactors, having serially connected contacts which must both be closed in order to establish a motor-energizing circuit; a braking-switching circuit-means, for establishing two dynamic-braking circuits wherein the armature or armatures of each of said series-motor means are loaded by the field winding or windings of the other series-motor means in series with one of said accelerating-resistance means, said two dynamic-braking circuits including an amount of braking resistance which is not normally used in the motor-accelerating circuit, said two dynamic-braking circuits having an initial "spotting" braking condition in which very little braking-force is normally developed, and a subsequent "service" braking condition in which a substantial braking- force is normally developed, said braking-switching circuit-means including braking-progression resistance-switching means for progressively reducing the amount of said braking resistance; a master controller including a plurality of on-positions and an off-position, said master controller having a plural-contact first on-position in which, when the master controller is moved from the first on-position to the off-position, a first-opening contact opens before a second-opening contact; a control-circuit motoring-initiating means, which is responsive to the first on-position of said master-controller, for initiating the operation of said power-switching circuit-means, under conditions wherein a first one of said two power-circuit contactors is closed in joint response to said second- opening contact and said power-availability relay, and wherein the second one of said two-power-circuit contactors is closed in a more direct response to said first-opening contact; a means for ensuring that at least one of the last of the braking-progression resistance-switching means, once it is actuated, will be maintained in response to a non-actuated condition of said second power-circuit contactor; control-circuit motoring-progression means, responsive to a more advanced on-position or positions of said master controller, for controlling successive stages in the motoring progression; a control-circuit braking-initiating means, which is jointly responsive to released conditions of both of said power-circuit contactors, and to a released condition of said one of the last of the braking-progression resistance-switching means, for initiating the operation of said braking-switch circuit-means; a service-braking control means which has an on-position and an off-position; a dynamic-braking control-means, which is responsive to an on-position of said service-braking control-means, for converting said braking-switching circuit means from said "spotting" braking condition to a "service" braking condition in which a substantial braking-force is normally developed under progressively controllable dynamic-braking conditions; and a means, which is jointly responsive to an on-position of said service-braking control-means and to the absence of a substantial braking-current in said dynamic-braking circuits, for opening said dynamic-braking circuits.

5. A control-assembly for an electrically propelled railway-car, which is adapted to be operable either singly or as a unit of a multiple-unit train; said control-assembly including: a motor-means for propelling said car; a supply-circuit for the motor-means; a power-switching circuit-means, for establishing a power-circuit, for operating the motor-means under progressively controllable motoring conditions; a braking-switching circuit-means, for establishing a dynamic-braking circuit for the motor-means, in a "spotting" braking condition in which very little braking-force is normally developed; a master controller including a plurality of on-positions and an off-position; a control-circuit means, which is responsive to successive on-positions of the master controller, for initiating, and controlling successive stages in, the operation of said power-switching circuit means; a control-circuit means, which is responsive to the off-position of the master controller, for initiating the operation of said braking-switching circuit-means; an air-brake assembly for bringing said car to a complete stop, said air-brake assembly comprising a pipe-line, a brake-valve for controlling the air-pressure in said pipe-line, a brake-actuator for responding to pressure in said pipe-line, an air-brake equipment for stopping said car, and an electrically controlled valve for controlling the application of air-pressure from said pipe-line to said air-brake equipment; a means, which is responsive to an operative condition of said braking-switch circuit-means, for actuating said electrically controlled valve; switch-interlock means, responsive to a response of said brake-actuator, for converting said braking-switch circuit-means from said "spotting" braking condition to a "service" braking condition in which a substantial braking-force is normally developed under progressively controllable dynamic-braking conditions; and a means, which is responsive to the absence of a substantial braking-current in said dynamic-braking circuit, for releasing said electrically controlled valve.

6. A control-assembly for an electrically propelled railway-car, which is adapted to be operable either singly or as a unit of a multiple-unit train; said control-assembly including: a motor-means for propelling said car; a supply-circuit for the motor-means; a power-switching circuit-means, for establishing a power-circuit, for operating the motor-means under progressively controllable motoring conditions; a braking-switching circuit-means, for establishing a dynamic-braking circuit for the motor means, in a "spotting" braking condition in which very little braking-force is normally developed; a master controller including a plurality of on-positions and an off-position; a control-circuit means, which is responsive to successive on-positions of the master controller, for initiating, and controlling successive stages in, the operation of said power-switching circuit means; a control-circuit means, which is responsive to the off-position of the master controller, for initiating the operation of said braking-switching circuit-means; an air-brake assembly for bringing said car to a complete stop, said air-brake assembly comprising a pipe-line, a brake-valve for controlling the air-pressure in said pipe-line, a brake-actuator for responding to pressure in said pipe-line, an air-brake equipment for stopping said car, and an electrically controlled valve for controlling the application of air-pressure from said pipe-line to said air-brake equipment; a means, which is responsive to an operative condition of said braking-switch circuit-means, for actuating said electrically controlled valve; switch-interlock means, responsive to a response of said brake-actuator, for converting said braking-switch circuit-means from said "spotting" braking condition to a "service" braking condition in which a substantial braking-force is normally developed under progressively controllable dynamic-braking conditions; and a means, which is responsive to one of the last steps in the "service" braking progression of the braking-switch circuit-means, for releasing said electrically controlled valve.

7. A control system for a plurality of direct-current series motors, said system including line switch means for connecting said motors to a direct-current power source for operation of the motors, control means for controlling acceleration of the motors, motor switch means for establishing a dynamic braking circuit for the motors, said braking circuit including a braking resistor, means for effecting progressive shunting of the braking resistor in a predetermined sequence of steps, means for holding said motor switch means in closed position until the shunting of the braking resistor has reached a predetermined point in said sequence, and means responsive to the current in the braking circuit for thereafter holding the motor switch means in closed position until said current falls below a predetermined value.

8. A control system for a plurality of direct-current series motors, said system including line switch means for connecting said motors to a direct-current power source for operation of the motors, control means for controlling acceleration of the motors, motor switch means for establishing a dynamic braking circuit for the motors, said braking circuit including a braking resistor, means for effecting progressive shunting of the braking resistor in a predetermined sequence of steps, means responsive to operation of said line switch means to open position for effecting operation of said motor switch means to establish the braking circuit, current limit means energized upon establishment of the braking circuit for effecting control of the current in the braking circuit to limit said current to a low value, and brake actuator means for deenergizing said current limit means and for initiating said progressive shunting of the braking resistor.

9. A control system for a plurality of direct-current series motors, said system including motor switch means for connecting said motors in power circuits for operation of the motors, line switch means for connecting the motors to a direct-current power source and for effecting operation of the motor switch means to establish said power circuits, control means for controlling acceleration of the motors, brake switch means, means responsive to operation of the line switch means to open position for effecting operation of the motor switch means and the brake switch means to establish a dynamic braking circuit for the motors, said braking circuit including a braking resistor, means for effecting progressive shunting of the braking resistor in a predetermined sequence of steps, current limit means energized upon establishment of the braking circuit for effecting control of the current in the braking circuit to limit said current to a low value, brake actuator means for deenergizing said current limit means and for initiating said progressive shunting of the braking resistor, means for holding said motor switch means in closed position during braking until the shunting of the braking resistor has reached a predetermined point in said sequence, and means responsive to the current in the braking circuit for thereafter holding the motor switch means closed until said current falls below a predetermined value.

10. A control system for a plurality of direct-current series motors, said system including series connection motor switches and parallel connection motor switches for selectively connecting the motors in power circuits, line switch means for connecting the motors to a direct current power source for operation of the motors, said motor switches having operating means for effecting operation of the motor switches to closed position and for holding them closed as long as the operating means are energized, control means for effecting operation of the line switches to closed position, the operating means of the motor switches being energized in response to operation of the line switches to closed position and under control of the control means to cause the motor switches to operate in a predetermined sequence to establish said power circuits, a brake switch, means responsive to operation of the line switches to open position for effecting energization of said parallel connection switches and of said brake switch to establish a dynamic braking circuit for the motors, means for controlling the current in said braking circuit, means for effecting deenergization of the operating means of the parallel connection motor switches, and holding means for said motor switches energized in response to the current in the braking circuit for holding the switches in closed position until said current falls to a predetermined value.

11. A control system for a plurality of direct-current series motors, said system including series connection motor switches and parallel connection motor switches for selectively connecting the motors in power circuits, line switch means for connecting the motors to a direct-current power source for operation of the motors, said motor switches having operating means for effecting operation of the motor switches to closed position and for holding them closed as long as the operating means are energized, control means for effecting operation of the line switches to closed position, the operating means of the motor switches being energized in response to operation of the line switches to closed position and under control of the control means to cause the motor switches to operate in a predetermined sequence to establish said power circuits, a brake switch, means responsive to operation of the line switches to open position for effecting energization of said parallel connection switches and of said brake switch to establish a dynamic braking circuit for the motors, said braking circuit including a braking resistor, control means for effecting progressive shunting of the braking resistor in a predetermined sequence of steps, means for effecting deenergization of the operating means of the parallel connection motor switches at a predetermined point in said sequence, and holding means for said motor switches energized in response to the current in the braking circuit for holding the switches in closed position until said current falls to a predetermined value.

References Cited in the file of this patent

UNITED STATES PATENTS

| | | |
|---|---|---|
| 2,128,034 | Austin | Aug. 23, 1938 |
| 2,318,330 | Purifoy | May 4, 1943 |
| 2,523,143 | Riley | Sept. 19, 1950 |
| 2,597,183 | Riley | May 20, 1952 |
| 2,637,008 | Barclay | Apr. 28, 1953 |
| 2,669,679 | Purifoy | Feb. 16, 1954 |
| 2,693,562 | Purifoy | Nov. 2, 1954 |
| 2,712,103 | Purifoy | June 28, 1955 |
| 2,748,335 | Purifoy | May 29, 1956 |